United States Patent
Kobayashi et al.

(10) Patent No.: US 12,404,836 B2
(45) Date of Patent: Sep. 2, 2025

(54) WIND POWER GENERATOR

(71) Applicant: TOYOTA JIDOSHA KABUSHIKI KAISHA, Aichi (JP)

(72) Inventors: Kunihiro Kobayashi, Toyota (JP); Eiji Ito, Susono (JP); Sou Morishita, Nagoya (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 18/527,368

(22) Filed: Dec. 4, 2023

(65) Prior Publication Data

US 2024/0183339 A1 Jun. 6, 2024

(30) Foreign Application Priority Data

Dec. 6, 2022 (JP) .................. 2022-195117

(51) Int. Cl.
| | |
|---|---|
| *F03D 7/00* | (2006.01) |
| *F03D 7/02* | (2006.01) |
| *F03D 9/25* | (2016.01) |
| *F03D 15/00* | (2016.01) |

(52) U.S. Cl.
CPC ........... *F03D 15/00* (2016.05); *F03D 7/0204* (2013.01); *F03D 7/0224* (2013.01); *F03D 9/25* (2016.05)

(58) Field of Classification Search
CPC ...... F03D 15/00; F03D 7/0204; F03D 7/0224; F03D 9/25; F03D 80/60; F03D 80/70; F03D 15/10; F03D 7/02; F03D 9/20; F03D 9/28; F05B 2260/31; F05B 2260/98
See application file for complete search history.

(56) References Cited

U.S. PATENT DOCUMENTS

| | | | |
|---|---|---|---|
| 2008/0205106 A1* | 8/2008 | Nakamura | ............... B60L 50/61 363/123 |
| 2014/0175802 A1 | 6/2014 | Taniyama et al. | |
| 2015/0045179 A1* | 2/2015 | Okuwaki | ............... B60W 10/08 180/65.265 |
| 2016/0159341 A1* | 6/2016 | Tabata | .................. B60W 10/06 180/65.23 |
| 2021/0332797 A1* | 10/2021 | Baba | ...................... G01R 19/30 |
| 2023/0279842 A1 | 9/2023 | Ito et al. | |

FOREIGN PATENT DOCUMENTS

| | | |
|---|---|---|
| JP | 2013-053548 A | 3/2013 |
| JP | 2023-128017 A | 9/2023 |

* cited by examiner

*Primary Examiner* — Julio C. Gonzalez
(74) *Attorney, Agent, or Firm* — HAUPTMAN HAM, LLP

(57) ABSTRACT

A wind power generator may include a wind turbine, a first motor generator configured to be driven by the wind turbine, a second motor generator, at least one mechanism configured to be driven by the second motor generator, a power split mechanism that couples a first shaft connected to the first motor generator, a second shaft connected to the second motor generator, and a third shaft to each other such that the first shaft, the second shaft, and the third shaft are configured to rotate differentially with respect to each other, and a rotation restricting mechanism configured to prohibit or restrict rotation of the third shaft.

8 Claims, 5 Drawing Sheets

WIND POWER GENERATOR

REFERENCE TO RELATED APPLICATIONS

This application claims priority from Japanese Patent Application No. 2022-195117 filed on Dec. 6, 2022. The entire content of the priority application is incorporated herein by reference.

TECHNICAL FIELD

The art disclosed herein relates to a wind power generator.

BACKGROUND ART

Japanese Patent Application Publication No. 2013-53548 describes a wind power generator with a first motor generator driven by a wind turbine, a second motor generator, and at least one mechanism (a cooling pump) driven by the second motor generator. A first shaft connected to the first motor generator and a second shaft connected to the second motor generator are not connected to each other.

DESCRIPTION

In the configuration of Japanese Patent Application Publication No. 2013-53548, the cooling pump cannot be driven unless the power is supplied to the second motor generator for operation. Therefore, while power is generated by the first motor generator, the power is consumed by the second motor generator, which may cause waste in terms of energy efficiency. This is not limited to the case where a mechanism driven by the second motor generator is a cooling pump. The present disclosure provides a technology that can improve energy efficiency of a wind power generator.

A wind power generator disclosed herein may comprise a wind turbine, a first motor generator configured to be driven by the wind turbine, a second motor generator, at least one mechanism configured to be driven by the second motor generator, a power split mechanism that couples a first shaft connected to the first motor generator, a second shaft connected to the second motor generator, and a third shaft to each other such that the first shaft, the second shaft, and the third shaft are configured to rotate differentially with respect to each other, and a rotation restricting mechanism configured to prohibit or restrict rotation of the third shaft.

According to the above configuration, the power generated by the rotation of the wind turbine can be distributed to the first motor generator and the second motor generator. Therefore, the power generated by the rotation of the wind turbine can be used to rotate not only the first motor generator but also the second motor generator. This allows the at least one mechanism connected to the second motor generator to be driven by the power from the rotation of the wind turbine without supplying power to the second motor generator for operation. For example, when the rotation of the wind turbine generates surplus power under a strong wind condition, a part of the power can be distributed to the second motor generator. This can reduce the power consumed by the second motor generator when the at least one mechanism is driven. Thus, the energy efficiency of the wind power generator can be improved.

In one or more embodiments, the at least one mechanism may comprise at least one of: a lubricating pump configured to supply lubricant to a part to be lubricated in the wind power generator; a cooling pump configured to supply coolant to a part to be cooled in the wind power generator; a cooling fan configured to supply cooling air to a part to be cooled in the wind power generator; a pitch angle changing mechanism configured to change a pitch angle of blades included in the wind turbine; and a yaw angle changing mechanism configured to change a yaw angle of a rotation axis of the wind turbine.

According to the above configuration, the power generated by the rotation of the wind turbine can be used for various purposes other than power generation.

In one or more embodiments, the wind power generator may further comprise a power supply circuit configured to supply power generated by the first motor generator to the second motor generator.

If the configuration in which an external power source supplies power to the second motor generator is employed, the power transmission loss may be relatively large. According to the above configuration, the power generated by the first motor generator can be supplied to the second motor generator. Therefore, the power transmission loss can be reduced.

In one or more embodiments, the rotation restricting mechanism may comprise at least one of: a locking mechanism configured to selectively lock and unlock rotation of the third shaft; a clutch mechanism configured to selectively connect and disconnect the third shaft to and from the wind turbine; and a transmission mechanism that connects the third shaft to the wind turbine via a torque limiter.

According to the above configuration, by at least one of the locking mechanism, the clutch mechanism, and the transmission mechanism, the way the power is split by the power split mechanism can be diversified.

In one or more embodiments, the at least one mechanism may be connected to the third shaft and configured to be driven by the second motor generator via the power split mechanism. The at least one mechanism may be configured to work as the rotation restricting mechanism.

According to the above configuration, the number of components in the wind power generator can be reduced because there is no need to provide a separate member such as the aforementioned locking mechanism.

Figure 1:
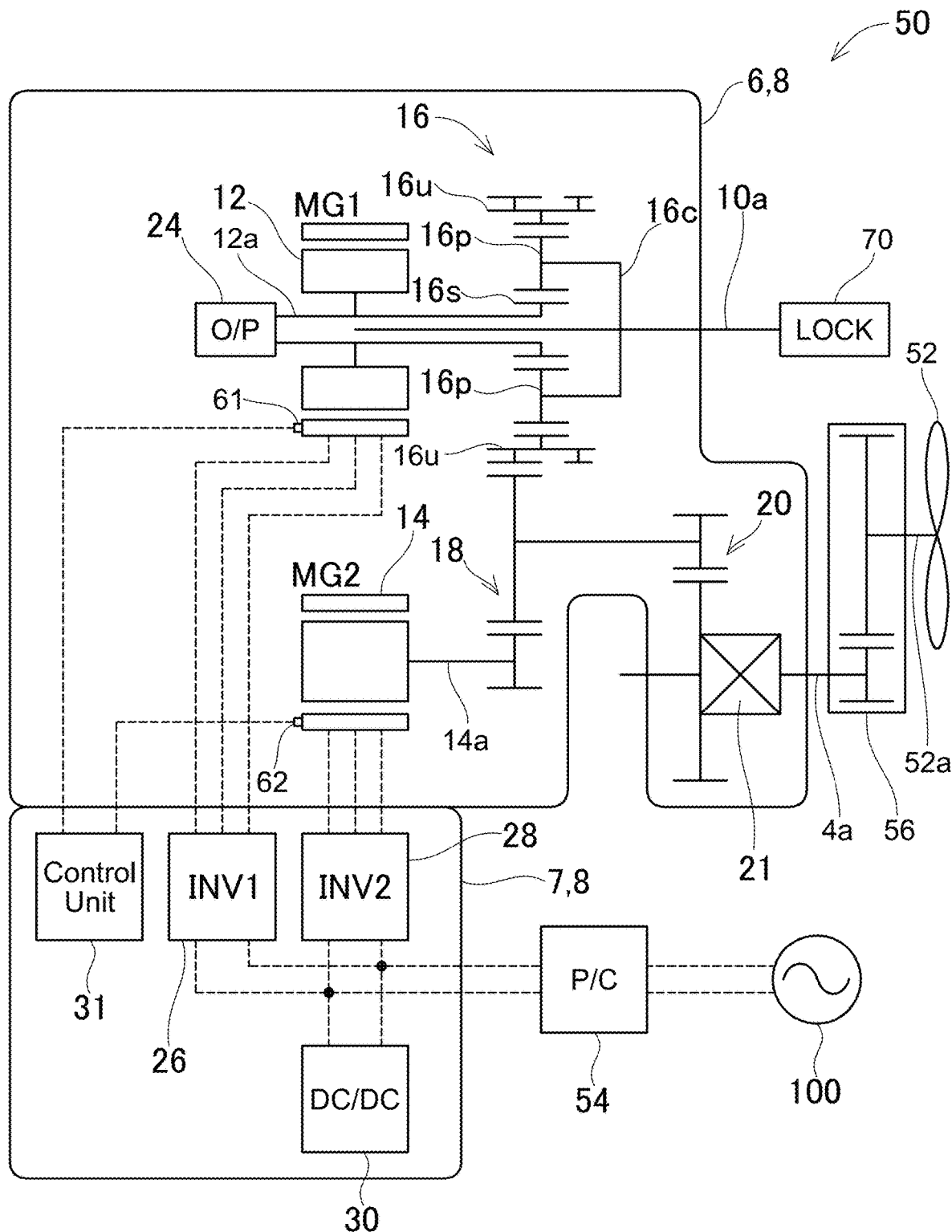
FIG. 1 schematically illustrates a wind power generator 50 of Embodiment 1.

Embodiment 1; Wind Power Generator 50; FIG. 1

A wind power generator 50 in the present embodiment includes a hybrid unit 8, a wind turbine 52, a power conditioner 54, a speed increasing gear 56, and a locking mechanism 70.

The hybrid unit 8 is a power unit taken from a hybrid vehicle (not shown). The hybrid unit 8 includes a transaxle 6 and a power control unit 7.

The transaxle 6 includes a first motor generator 12 and a second motor generator 14. The first motor generator 12 is a motor generator with a lower rated output than the second motor generator 14. In the drawings, the first motor generator 12 may be illustrated as MG1 and the second motor generator 14 may be illustrated as MG2.

The first motor generator 12 is connected to a first motor shaft 12a. The first motor generator 12 can rotate the first motor shaft 12a in response to power being supplied thereto. The first motor generator 12 can also generate power in response to the rotation of the first motor shaft 12a.

The second motor generator 14 is connected to a second motor shaft 14a. The second motor generator 14 can rotate the second motor shaft 14a in response to power being supplied thereto. The second motor generator 14 can also generate power in response to the rotation of the second motor shaft 14a.

The transaxle 6 further includes a planetary gear mechanism 16. The planetary gear mechanism 16 connects an engine shaft 10a, the first motor shaft 12a, and the second motor shaft 14a such that they are configured to rotate differentially with respect to each other. The planetary gear mechanism 16 can be called a power split mechanism.

The planetary gear mechanism 16 includes a sun gear 16s, a plurality of planetary gears 16p, a planetary carrier 16c, and a ring gear 16u. The sun gear 16s is connected to the first motor shaft 12a. The plurality of planetary gears 16p is arranged around the sun gear 16s and is engaged with the sun gear 16s. The planetary carrier 16c rotatably supports the plurality of planetary gears 16p and is connected to the engine shaft 10a. The ring gear 16u is located around the plurality of planetary gears 16p and is engaged with the plurality of planetary gears 16p. The ring gear 16u is connected to the second motor shaft 14a via a first speed reduction mechanism 18. The ring gear 16u is also connected to an axle 4a via a second speed reduction mechanism 20 and a differential gear 21. The axle 4a is connected to a main shaft 52a of the wind turbine 52 via a speed increasing gear 56.

The locking mechanism 70 is provided on the engine shaft 10a. The locking mechanism 70 is configured to selectively lock and unlock the rotation of the engine shaft 10a. When the rotation of the engine shaft 10a is locked, the first motor shaft 12a rotates with respect to the second motor shaft 14a at a predetermined speed increase ratio. On the other hand, when the rotation of the engine shaft 10a is unlocked, substantially no load is applied on the engine shaft 10a. Therefore, the first motor shaft 12a and the second motor shaft 14a can rotate independently of each other. Hereafter, the state in which the rotation of the engine shaft 10a is locked may be referred to as "locked state". The state in which the rotation of the engine shaft 10a is unlocked may be referred to as "unlocked state".

The transaxle 6 further includes a mechanical oil pump 24. The mechanical oil pump 24 is connected to the first motor shaft 12a and is driven in response to the rotation of the first motor shaft 12a. When the mechanical oil pump 24 is driven, the mechanical oil pump 24 circulates lubricating oil in the transaxle 6. This allows each component of the transaxle 6 to be lubricated and cooled. A flow rate of the lubricating oil circulated by the mechanical oil pump 24 varies according to an amount of rotation of the first motor shaft 12a.

The power control unit 7 is integrated with the transaxle 6. The power control unit 7 is electrically connected to an external power system 100 via the power conditioner 54.

The power control unit 7 includes a first inverter 26, a second inverter 28, a DC-DC converter 30, and a control unit 31. The control unit 31 is, for example, a power control unit (PCU). The first inverter 26 is electrically connected to the first motor generator 12. The second inverter 28 is electrically connected to the second motor generator 14. The first inverter 26, the second inverter 28, and the power conditioner 54 are electrically connected to each other.

The first inverter 26 can convert AC power from the first motor generator 12 to DC power and supply it to the second inverter 28 and/or the power conditioner 54. The first inverter 26 can also convert DC power from the second inverter 28 and/or the power conditioner 54 to AC power and supply it to the first motor generator 12. The control unit 31 can control the operation of the first motor generator 12 via the first inverter 26.

The second inverter 28 can convert AC power from the second motor generator 14 to DC power and supply it to the first inverter 26 and/or the power conditioner 54. The second inverter 28 can also convert DC power from the first inverter 26 and/or the power conditioner 54 to AC power and supply it to the second motor generator 14. The control unit 31 can control the operation of the second motor generator 14 via the second inverter 28.

Temperature sensors 61 and 62 are provided on the first and second motor generators 12 and 14, respectively. Temperature data outputted from the temperature sensors 61 and 62 is inputted to the control unit 31. The control unit 31 can calculate the optimum value of a circulation flow rate of the lubricating oil based on the temperature data outputted from the temperature sensors 61 and 62.

The control unit 31 is electrically connected to the locking mechanism 70. The control unit 31 can control the operation of the locking mechanism 70. That is, the control unit 31 can switch the wind power generator 50 between the locked and unlocked states. Normally, the control unit 31 sets the wind power generator 50 in the locked state.

(Operation of Wind Power Generator 50 in Locked State)

When the wind turbine 52 rotates under wind power, the first motor shaft 12a rotates and the second motor shaft 14a rotates. In response to the rotation of the first motor shaft 12a, power is generated by the first motor generator 12 and the mechanical oil pump 24 is driven. In addition, power is generated by the second motor generator 14 in response to the rotation of the second motor shaft 14a.

In the locked state, the mechanical oil pump 24 can be driven without supplying the power to the first motor generator 12 for operation. However, there can be a situation in which the circulation flow rate of the lubricating oil becomes excessive with respect to the optimum value or in which the circulation flow rate of the lubricating oil becomes insufficient with respect to the optimum value can be assumed. When such a situation is about to happen, the control unit 31 switches the wind power generator 50 to the unlocked state.

(Operation of Wind Power Generator 50 in Unlocked State)

When the wind turbine 52 rotates under wind power, the engine shaft 10a rotates and the second motor shaft 14a rotates. Power is generated by the second motor generator 14 in response to the rotation of the second motor shaft 14a.

The power control unit 7 supplies a part of the power generated by the second motor generator 14 to the first motor generator 12. This drives the first motor generator 12, and the first motor shaft 12a rotates. The power control unit 7 can adjust the amount of rotation of the first motor shaft 12a as it intends by adjusting the power supplied to the first motor generator 12. As a result, the power control unit 7 can drive the mechanical oil pump 24 so that the circulating flow rate of the lubricating oil becomes the optimum value.

Figure 2:
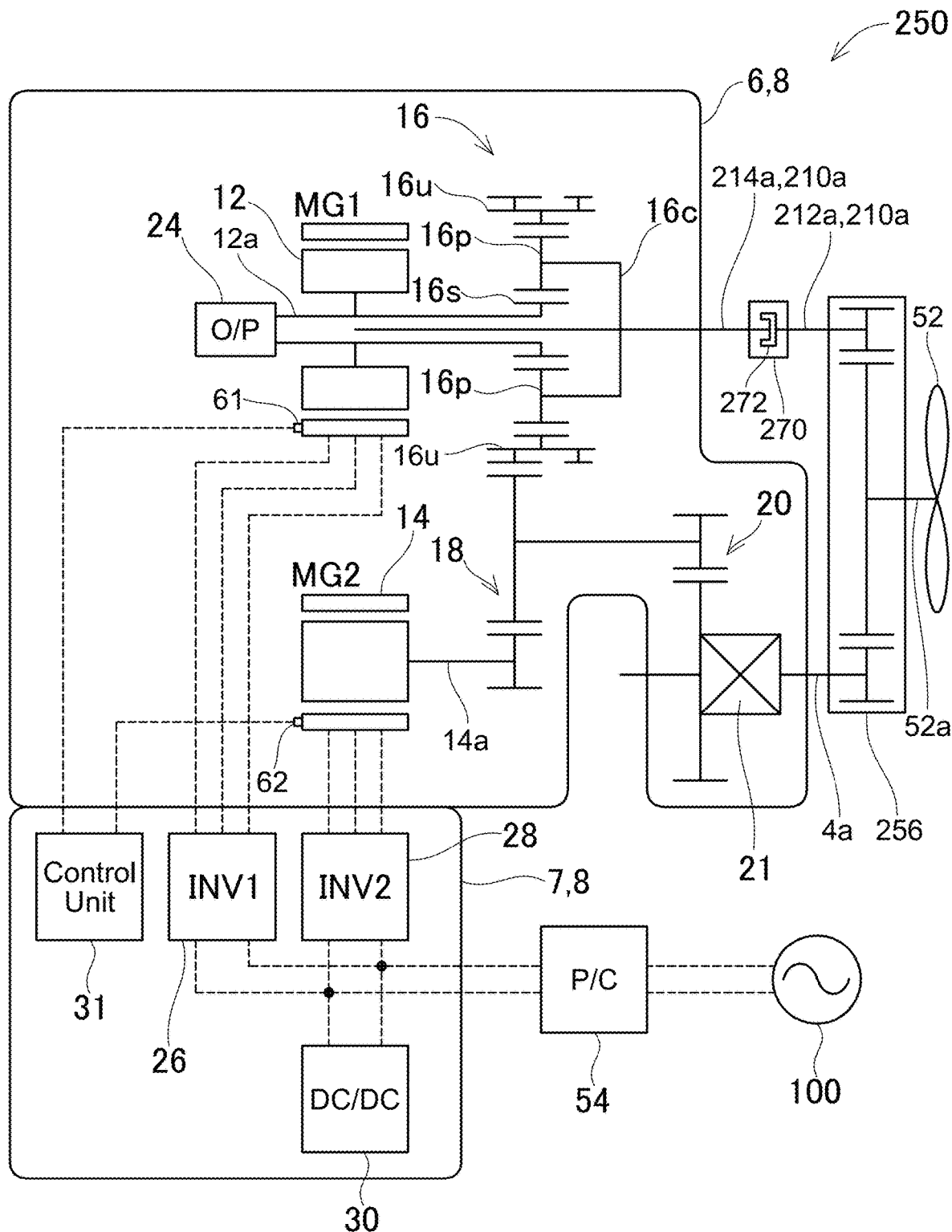
FIG. 2 schematically illustrates a wind power generator 250 of Embodiment 2.

Embodiment 2; Wind Power Generator 250; FIG. 2

In the following, only the differences between a wind power generator 250 and the wind power generator 50 (see FIG. 1) are explained.

In the present embodiment, a clutch mechanism 270 is provided instead of the locking mechanism 70 (see FIG. 1). The clutch mechanism 270 includes a clutch 272. An engine shaft 210a is provided instead of the engine shaft 10a (see FIG. 1). A speed increasing gear 256 is provided in place of the speed increasing gear 56 (see FIG. 1).

The engine shaft 210a includes a first engine shaft 212a and a second engine shaft 214a. The first engine shaft 212a connects the clutch 272 to the speed increasing gear 256. The second engine shaft 214a connects the clutch 272 to the planetary gear mechanism 16.

The speed increasing gear 256 connects the first engine shaft 212a and the main shaft 52a to each other so that the first engine shaft 212a rotates at a first speed increase ratio relative to the main shaft 52a. The speed increasing gear 256 also connects the axle 4a and the main shaft 52a to each other so that the axle 4a rotates at a second speed increase ratio relative to the main shaft 52a. The first speed increase ratio is greater than the second speed increase ratio.

The clutch mechanism 270 is configured to selectively connect and disconnect between the first engine shaft 212a and the second engine shaft 214a. Hereafter, the state in which the first engine shaft 212a and the second engine shaft 214a are connected may be referred to as "clutch connected state". The state in which the first engine shaft 212a and the second engine shaft 214a are disconnected may be referred to as "clutch disconnected state". The control unit 31 can switch the wind power generator 250 between the clutch connected state and the clutch disconnected state. Normally, the control unit 31 sets the wind power generator 250 to the clutch connected state.

(Operation of Wind Power Generator 250 in Clutch Connected State)

When the wind turbine 52 rotates under wind power, the engine shaft 210a, the first motor shaft 12a, and the second motor shaft 14a rotate in conjunction with each other. In response to the rotation of the first motor shaft 12a, power is generated by the first motor generator 12 and the mechanical oil pump 24 is driven. In addition, power is generated by the second motor generator 14 in response to the rotation of the second motor shaft 14a.

In the clutch connected state, the mechanical oil pump 24 can be driven without the operation of the first motor generator 12 to transmit the power thereto. However, there can be a situation in which the circulation flow rate of the lubricating oil becomes excessive with respect to the optimum value or in which the circulation flow rate of the lubricating oil becomes insufficient with respect to the optimum value can be assumed. When such a situation is expected to happen, the control unit 31 switches the wind power generator 250 to the clutch disconnected state.

(Operation of Wind Power Generator 250 in Clutch Disconnected State)

When the wind turbine 52 rotates under wind power, the second motor shaft 14a rotates. Power is generated by the second motor generator 14 in response to the rotation of the second motor shaft 14a.

The power control unit 7 supplies a part of the power generated by the second motor generator 14 to the first motor generator 12. This drives the first motor generator 12, and the first motor shaft 12a rotates. The power control unit 7 can adjust the amount of rotation of the first motor shaft 12a as it intends by adjusting the power supplied to the first motor generator 12. As a result, the power control unit 7 can drive the mechanical oil pump 24 so that the circulating flow rate of the lubricating oil becomes the optimum value.

Figure 3:
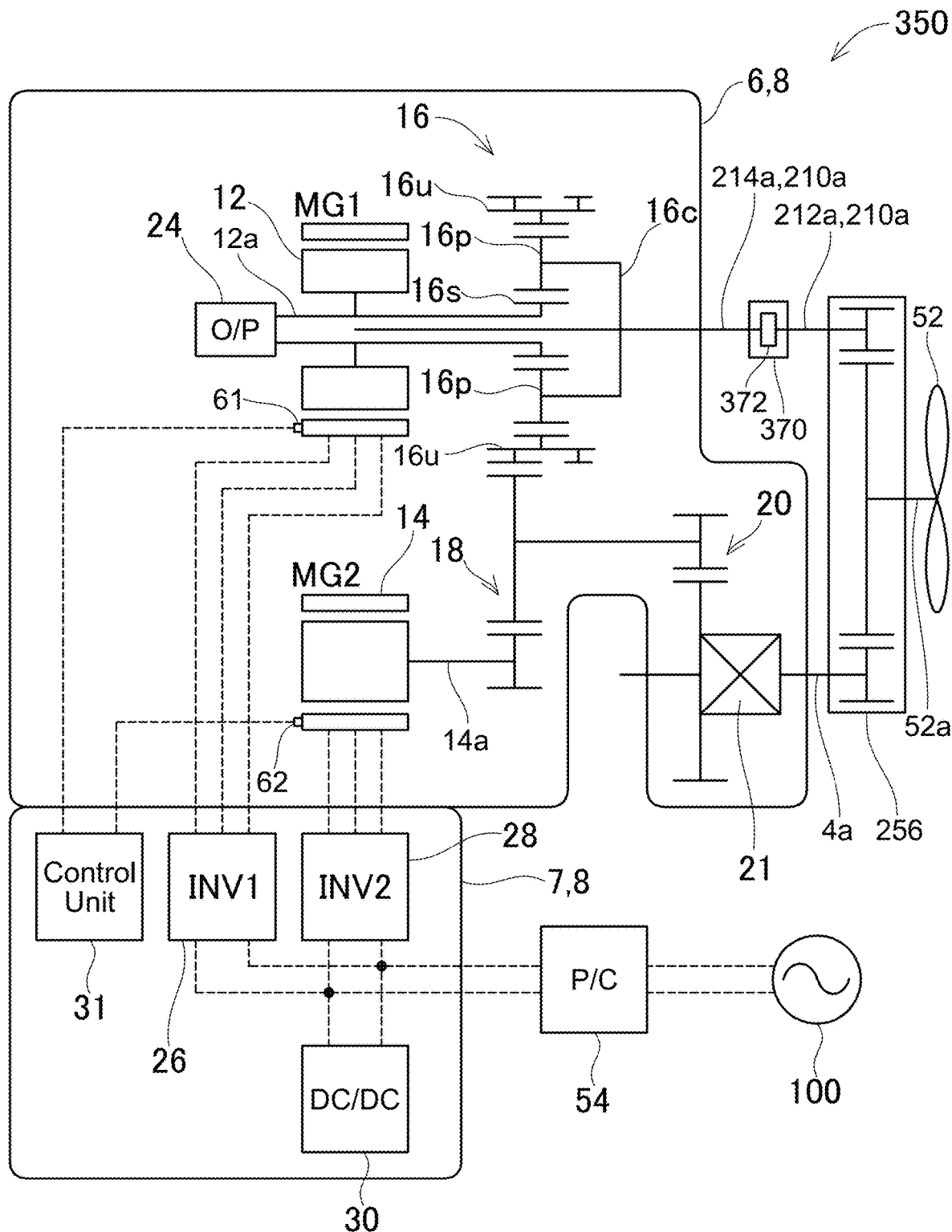
FIG. 3 schematically illustrates a wind power generator 350 of Embodiment 3.

Embodiment 3; Wind Power Generator 350; FIG. 3

In the following, only the differences between a wind power generator 350 and the wind power generator 250 (see FIG. 2) are explained.

In the present embodiment, a transmission mechanism 370 is provided instead of the clutch mechanism 270 (see FIG. 2). The transmission mechanism 370 includes a torque limiter 372. The torque limiter 372 limits the torque generated between the first engine shaft 212a and the second engine shaft 214a at or below a predetermined value. For example, when the wind turbine 52 rotates excessively, the torque limiter 372 can reduce the torque inputted to the mechanical oil pump 24. In this way, the torque limiter 372 can suppress the circulating flow rate of the lubricating oil from becoming excessive.

(Operation of Wind Power Generator 350)

When the wind turbine 52 rotates under wind power, the engine shaft 210a, the first motor shaft 12a, and the second motor shaft 14a rotate in conjunction with each other. In response to the rotation of the first motor shaft 12a, power is generated by the first motor generator 12 and the mechanical oil pump 24 is driven. In the present embodiment, power generation by the first motor generator 12 is not performed.

The power control unit 7 supplies a part of the power generated by the second motor generator 14 to the first motor generator 12. This drives the first motor generator 12 and increases (or decreases) the rotation speed of the first motor shaft 12a. The power control unit 7 can adjust the amount of rotation of the first motor shaft 12a as it intends by adjusting the power supplied to the first motor generator 12. In this way, the power control unit 7 can drive the mechanical oil pump 24 so that the circulating flow rate of the lubricating oil becomes the optimum value.

Figure 4:
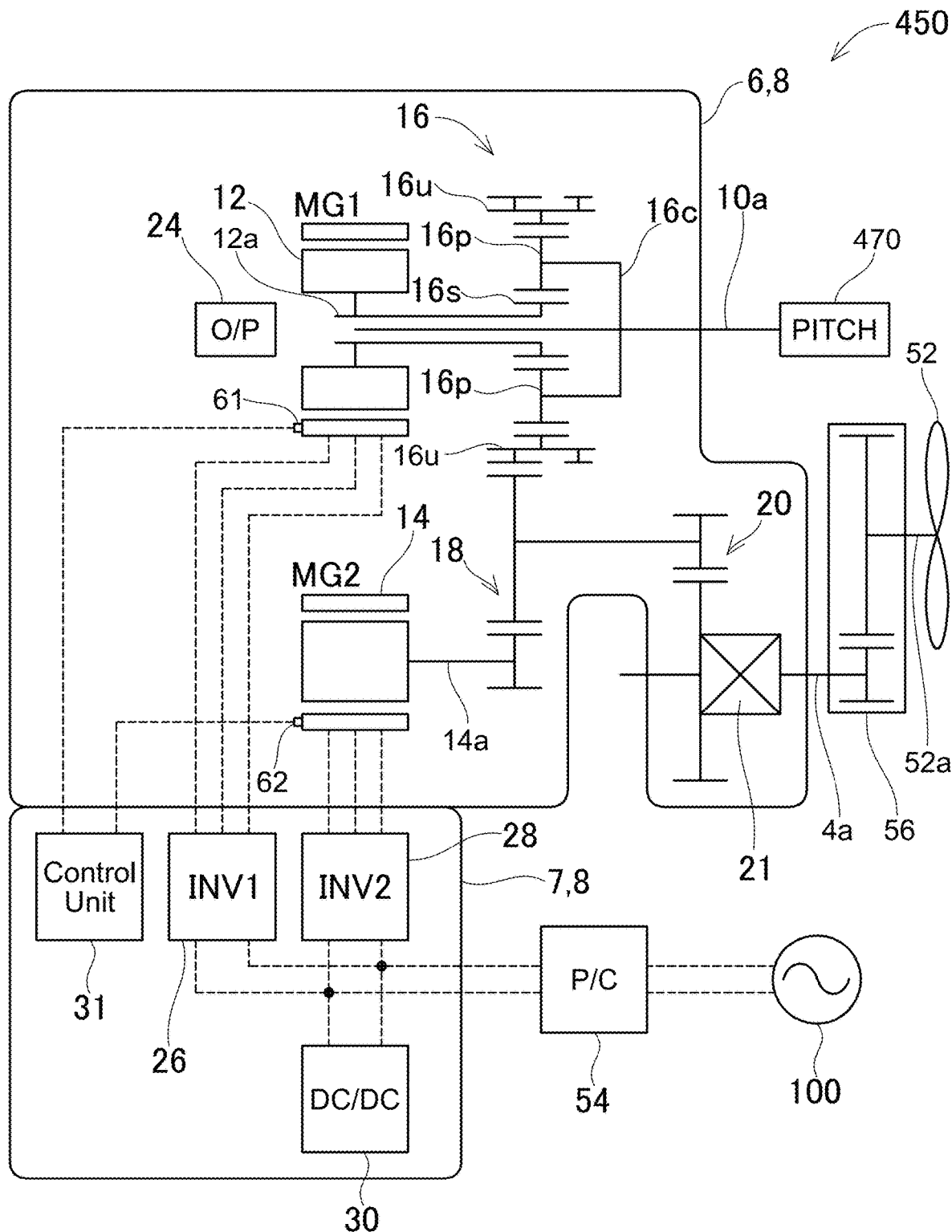
FIG. 4 schematically illustrates a wind power generator 450 of Embodiment 4.

Embodiment 4; Wind Power Generator 450; FIG. 4

In the following, only the differences between a wind power generator 450 and the wind power generator 50 (see FIG. 1) are explained.

In the present embodiment, a pitch angle changing mechanism 470 is provided instead of the locking mechanism 70 (see FIG. 1). The mechanical oil pump 24 is not connected to the first motor shaft 12a. The mechanical oil pump 24 in the present embodiment is driven, for example, by an actuator (not shown).

The pitch angle changing mechanism 470 is connected to the engine shaft 10a and is driven in response to the rotation of the engine shaft 10a. When the pitch angle changing mechanism 470 is driven, the pitch angle changing mechanism 470 changes a pitch angle of blades of the wind turbine 52. Connecting the pitch angle changing mechanism 470 to the engine shaft 10a applies a load on the engine shaft 10a.

(Operation of Wind Power Generator 450)

When the wind turbine 52 rotates under wind power, the engine shaft 10a, the first motor shaft 12a, and the second motor shaft 14a rotate in conjunction with each other. The pitch angle changing mechanism 470 is driven in response to the rotation of the engine shaft 10a. In addition, power is generated by the second motor generator 14 in response to the rotation of the second motor shaft 14a. In the present embodiment, power generation by the first motor generator 12 is not performed.

The power control unit 7 supplies a part of the power generated by the second motor generator 14 to the first motor generator 12. This drives the first motor generator 12 and increases (or decreases) the rotation speed of the first motor shaft 12a. The power control unit 7 can adjust the amount of rotation of the first motor shaft 12a as it intends by adjusting the power supplied to the first motor generator 12. By adjusting the amount of rotation of the first motor shaft 12a, the power control unit 7 adjusts the amount of rotation of the engine shaft 10a. This allows the power control unit 7 to operate the pitch angle changing mechanism 470 at the appropriate operating point.

Figure 5:
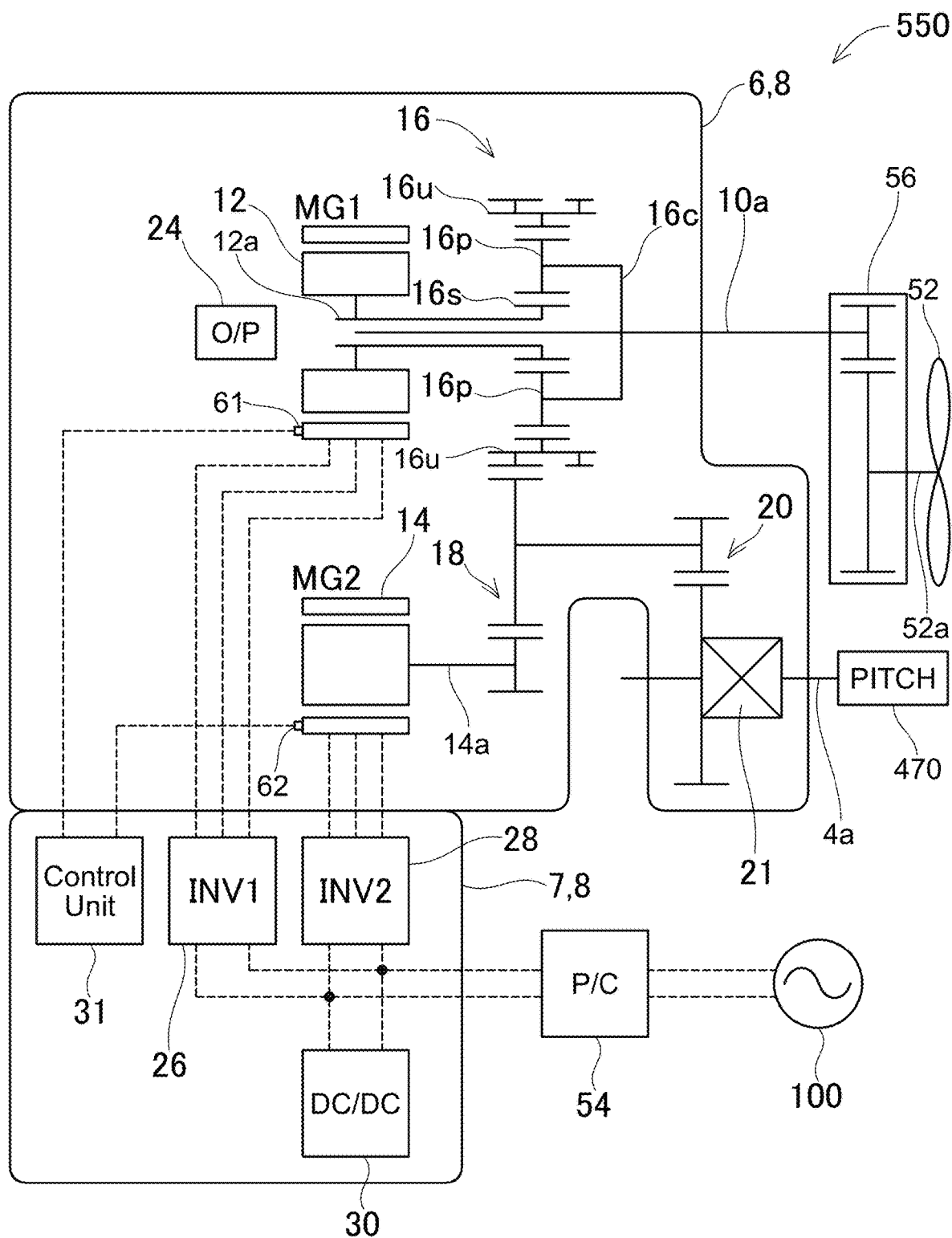
FIG. 5 schematically illustrates a wind power generator 550 of Embodiment 5.

Embodiment 5; Wind Power Generator 550; FIG. 5

In the following, only the differences between a wind power generator 550 and the wind power generator 450 (see FIG. 4) are explained.

In the present embodiment, the pitch angle changing mechanism 470 is connected to the axle 4a instead of being connected to the engine shaft 10a. Further, the speed increasing gear 56 connects the engine shaft 10a to the main shaft 52a instead of connecting the axle 4a to the main shaft 52a.

(Operation of Wind Power Generator 550)

When the wind turbine 52 rotates under wind power, the engine shaft 10a, the first motor shaft 12a, and the second motor shaft 14a rotate in conjunction with each other. Power is generated by the first motor generator 12 in response to the rotation of the first motor shaft 12a. In the present embodiment, power generation by the second motor generator 14 is not performed. The power control unit 7 supplies a part of the power generated by the first motor generator 12 to the second motor generator 14. This drives the second motor generator 14 and increases (or decreases) the rotation of the second motor shaft 14a. The power control unit 7 can adjust the amount of rotation of the second motor shaft 14a as it intends by adjusting the power supplied to the second motor generator 14. By adjusting the amount of rotation of the second motor shaft 14a, the power control unit 7 adjusts the amount of rotation of the axle 4a. This allows the power control unit 7 to operate the pitch angle changing mechanism 470 at the appropriate operating point.

Variants

The position of the first motor generator 12 and the position of the second motor generator 14 may be interchanged with each other.

Another power splitting mechanism (e.g., a differential gear) may be provided instead of the planetary gear mechanism 16.

Another mechanism may be provided in place of the mechanical oil pump 24. For example, a cooling fan may be provided to supply cooling air to components of the transaxle 6.

Another mechanism may be provided instead of the pitch angle changing mechanism 470. For example, a yaw angle changing mechanism configured to change a yaw angle of the main shaft 52a of the wind turbine 52 may be provided.

Two of the locking mechanism 70, the clutch mechanism 270, and the transmission mechanism 370 may be provided on the engine shaft 10a (210a) at the same time. Alternatively, all of the locking mechanism 70, the clutch mechanism 270, and the transmission mechanism 370 may be installed on the engine shaft 10a (210a) at the same time.

The power control unit 7 may adjust the amount of rotation of the first motor shaft 12a by adjusting the power generation torque applied to the first motor generator 12.

Power generation by the first motor generator 12 may not be performed. That is, the first motor generator 12 may function only as a prime mover to rotate the first motor shaft 12a.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A wind power generator, comprising:
a wind turbine;
a first motor generator mechanically connected to the wind turbine, wherein the first motor generator is driven by rotation of the wind turbine;
a second motor generator;
at least one mechanism configured to be driven by the second motor generator;
a power split mechanism comprising:
 a ring gear,
 a plurality of planetary gears engaged with the ring gear,
 a planetary carrier rotatably supporting the plurality of planetary gears,
 a sun gear engaged with the plurality of planetary gears,
 a first shaft connected to the first motor generator, wherein the ring gear is connected to the first shaft,
 a second shaft connected to the second motor generator, wherein the sun gear is connected to the second shaft, and
 a third shaft connected to the planetary carrier; and
a rotation restricting mechanism configured to prohibit or restrict rotation of the third shaft, wherein
the at least one mechanism comprises a pitch angle changing mechanism configured to change a pitch angle of blades included in the wind turbine,
the pitch angle changing mechanism is connected to the third shaft and configured to be driven by the second motor generator via the power split mechanism, and
the pitch angle changing mechanism is configured to work as the rotation restricting mechanism.

2. The wind power generator according to claim 1, further comprising a power supply circuit configured to supply power generated by the first motor generator to the second motor generator.

3. The wind power generator according to claim 1, wherein
the at least one mechanism comprises a cooling pump configured to supply coolant to a part to be cooled in the wind power generator.

4. The wind power generator according to claim 1, wherein
the at least one mechanism comprises a cooling fan configured to supply cooling air to a part to be cooled in the wind power generator.

5. The wind power generator according to claim 1, wherein
   the at least one mechanism comprises a yaw angle changing mechanism configured to change a yaw angle of a rotation axis of the wind turbine.

6. The wind power generator according to claim 1, wherein
   the rotation restricting mechanism comprises a locking mechanism configured to selectively lock and unlock rotation of the third shaft.

7. The wind power generator according to claim 1, wherein
   the rotation restricting mechanism comprises a clutch mechanism configured to selectively connect and disconnect the third shaft to and from the wind turbine.

8. The wind power generator according to claim 1, wherein
   the rotation restricting mechanism comprises a transmission mechanism that connects the third shaft to the wind turbine via a torque limiter.

\* \* \* \* \*